United States Patent Office 2,947,667
Patented Aug. 2, 1960

2,947,667
MALT OF IMPROVED PROPERTIES, FERMENTED MALT BEVERAGES, AND PROCESS OF MAKING SAME
Ernst Komm, Bergstrasse 13, Munich 9, Germany
No Drawing. Filed May 21, 1957, Ser. No. 660,447
Claims priority, application Germany May 29, 1956
12 Claims. (Cl. 195—70)

The present invention relates to the production of beer or other fermented beverages and, more particularly, to the preparation of fermented beverages in the production of which malt is used, and to such fermented beverages.

Fermented beverages, especially beer, are prepared from kiln-dried raw malts. Such malts are obtained from grain and especially from barley which is caused to germinate by first steeping the grain at a comparatively low temperature, for instance, at a temperature between about 10° C. and about 15° C. for 50 to 70 hours. Thereby, the grain absorbs moisture and the dormant embryo in each grain becomes activated. Usually steeping is interrupted several times by draining the water from the tank and refilling it in order to supply the required amount of oxygen to the grain. It is, of course, also possible to supply oxygen to the steeping mixture by directly introducing air into the tank. As stated above, the steeping time varies from 50 to 70 hours whereby the grain is under water about twice as long as it is exposed to air. Steeping removes much of the tannins, bitter resins, and some of the proteins. Especially the bitter resins and tannins adversely affect the flavor of the malt so that the steeping process involves a considerable improvement in the subsequent mashing and fermenting operations.

Steeping is usually continued until the moisture content of the grain reaches a value between about 45% and about 47%. After steeping, the grain is transferred to the germinating apparatus.

During germination the growth of the embryo which was arrested at the ripening of the seed is reactivated. Thereby the acrospire grows on the dorsal surface within the husk of the kernel toward the distal end. Rootlets arise from the germ and emerge from the proximal end of the kernel. During germination, the many biological changes converting raw grain to malt take place.

Strict moisture and temperature control must be maintained thereby. Two methods of germination are now usually conducted, the drum method and the compartment method. For drum germination, the steeped grain is placed in large rotating cylinders and is treated therein with attemperated air of 100% humidity at a temperature between about 10° C. and 20° C. Since both rootlets and acrospire grow at the expense of endosperm proteins and carbohydrates, their growth must be properly controlled to obtain maximum carbohydrate yield.

In compartmant germination, the steeped barley is placed in long compartments, the floors of which are constructed of slotted screens that permit attemperated air to flow through the grain. The grain is turned at intervals so as to expose all parts thereof to the surrounding air. Ordinarily a water sprayer is arranged above the compartments for maintaining the proper moisture level within the grain.

Germination is usually carried out for about 6 days. Thereafter, the germinated grain or green malt is transferred to kilns wherein its moisture content is reduced from about 45% to about 2% to 4%. Kilning usually takes either 2 or 3 days whereby the temperature of the grain at the end of the drying process is about 90 to 110° C. It is understood, of course, that the temperature at the beginning of the kilning process is quite low and only gradually increases from a temperature of 20° C. to a temperature of 60° C. The resulting kiln-dried malt is then used as starting material for the fermentation to beer and other fermented malt beverages.

The chemical changes occurring during steeping, germination, and kiln-drying, i.e., during malting are manifold. According to our present knowledge the cell walls of the starch-containing cells are digested by the malt enzymes during malting. Thereby the percentage of cold water-soluble carbohydrates which are mostly non-starch carbohydrates increases, for instance, in barley from 10% to 20% in the malt. The water extracts contain raffinose, maltose, sucrose, galactose, dextrose, fructose, arabinose, xylose, ribose, and uronic acids. The concentration of sugars in the malt is about 4 times that of barley. Degradation of the cell wall permits the amylases to liquefy and hydrolyze the starch of the malt during the mashing process in the brewery. The insoluble $\beta$-amylase is rendered soluble through the malting process. The proteolytic activity also increases during malting. The proteins of the endosperm matrix are hydrolyzed for resynthesis within the expanding acrospire. Degradation of high molecular weight proteins to lower molecular weight protein fractions is also achieved by malting. This is desired by the brewer for producing a stable beer. It is evident that malting causes activation of considerable amounts of ferments and especially of carbohydrases.

However, it is evident that the ferments formed in the grain are capable of exerting their activity during the drying step carried out for many hours and even days, since they are especially activated during the relatively slow increase in temperature of the malt from about 20° C. to about 60° C. When proceeding according to the known prolonged drying process in kilns, the cytolytic ferments are also capable of exerting their cytolytic activity at temperatures up to 60° C. Since such cytolytic ferments are capable of causing degradation of cellulose and other complex polysaccharides, such as the so-called cellulose companions like hemicellulose, pectins, and the like, these compounds which increase the viscosity of beer and other beverages brewed therefrom are substantially eliminated during the conventional drying process.

On investigating fermented malt beverages and especially beer for their foaming power and their foam-holding capacity it was found that a slightly increased viscosity of these beverages is of primary importance with respect to said properties. Such a slight increase in viscosity is apparently due to an increased content of soluble cellulosic or, respectively, hemicellulosic constituents in the beverage. So-called mucilages, vegetable gums, pectic substances, pectin-like compounds or, respectively, mixtures containing such substances or at least some of them are responsible for the increased viscosity.

The heretofore used malting processes, however, do not permit the production of a malt having an increased content of substances which are capable of imparting a higher viscosity to malt beverages and of improving thereby their foaming power and foam-holding capacity, their stability, color, and taste. Many attempts have been made heretofore to achieve this purpose without any substantial success.

It is one object of the present invention to overcome the disadvantages of the conventionally used malting processes and to provide a malt which permits the production of beer and other fermented malt beverages of considerably improved properties.

Another object of the present invention is to provide a specific green malt product which is especially suitable for the production of beer and other fermented malt beverages of improved properties.

A further object of the present invention is to provide a simple and effective process of producing such a valuable specific green malt product.

Still another object of the present invention is to provide a new and improved process of preparing beer and other fermented beverages by means of malt, and more particularly by simultaneous use of kiln-dried malt and a specific green malt, whereby beer and other fermented beverages with increased viscosity, improved stability, foaming power, and foam-holding capacity, light color, and an agreeable mild taste are obtained.

A further object of the present invention is to provide beer and other fermented beverages prepared by the simultaneous use of kiln-dried malt and a specific green malt, said beverages being of increased viscosity, improved stability, foaming power, foam-holding capacity, light color, and agreeable mild taste.

Other objects of the present invention and advantageous features thereof will become apparent as the description proceeds.

On investigating malts of various composition and prepared according to various methods, it was found that it is possible to provide malts especially rich in substances which are capable of imparting a higher viscosity to fermented malt beverages. To produce such malts, it is necessary to subject the grain immediately after the onset of germination in their green state to a short-time drying process whereby drying is effected within a very short period of time, i.e. within 15 minutes, or even less, at temperatures exceeding 60° C. Another characteristic feature of the process is that the malt is dried thereby or subsequently to a water content which amounts to 15% at the most, but in general not lower than 6%.

Thus, the most preferred types of malt suitable for the purpose of the present invention are malts which are subjected to a very rapid drying process at a high temperature a short time after germination had set in.

The preferred drying time is between about 5 minutes and about 15 minutes, the preferred temperature is between about 60° C. and about 80° C. and the preferred water content of the resulting dried malt is between about 7% and about 12%.

Such a rapid drying of the green malt has the effect that substantially no fermentative processes take place in the malt during drying. More particularly no cytolytic degradation processes are observed thereby; since the specific carbohydrases which exert such cytolytic effects, for instance, cytase, lose their fermentative activity at a temperature of 60° C. and above. Therefore, no dissolution and degradation of cellulose and cellulose-accompanying substances takes place. The dried malt product is characterized by an increased content of readily swelling starch, completely or partly heat-coagulated protein, and viscosity increasing substances which, on subsequent mashing, are dissolved and are present in the extract, thus, causing increased viscosity on subsequent mashing and fermentation to beer and the like fermented malt beverages.

To produce beer or the like fermented malt beverages with such a malt, a mash is prepared in the usual manner by mashing kiln-dried malt and adding thereto at any time of the mashing process the rapidly high temperature-dried green malt according to the present invention in an amount between about 30% and about 50% of the kiln-dried malt. The resulting mixed mash is then worked up to wort, boiled with hop, fermented, and finished in the same manner as conventionally prepared mash whereby beer and other fermented malt beverage of greatly improved properties are obtained.

According to one embodiment of the present invention, a green malt product is used which has been obtained from green malt heated in grain form.

According to another embodiment of the present invention a green malt product is used which has been obtained from squashed or crushed green malt by heating.

According to a further embodiment of the present invention a green malt product is used which was heated on roller driers, preferably on roller driers provided with charging rollers and/or crushing cylinders.

According to a further embodiment of the present invention a green malt product is used which was obtained by heating green malt on rotary driers.

According to still another embodiment of the present invention a green malt product is used which was obtained from green malt passed over plain rollers, preferably after rapid steaming so as to impart to the malt a temperature of at least about 60° C. within less than 15 minutes, for instance, within five minutes and which was then dried on a suitable drier so rapidly that the malt attained a temperature exceeding 60° C. within a few minutes, whereby its water content was reduced to a value of 15% and less.

According to another embodiment of the present invention, green malt is suspended in water and the suspension is then exposed to the action of a vigorous current of gas, such as oxygen, especially to the action of a current of air, whereby the malt is agitated and the rootlets formed on germination are broken off. The rootlets rise to the water surface from where they are removed, for instance, by providing an overflow device, by skimming them off, or by stripping them. Thereafter, the green malt is heated, if desired, after squashing or crushing, on roller driers or rotary driers, preferably in such a manner and with such a speed that it attains a temperature exceeding about 60° C. within a few minutes and that its water content is reduced to about 15% or even less. The resulting green malt is then mashed together with kiln-dried malt in a manner known for making beer and the mash is boiled with hop and fermented.

According to another embodiment of the present invention, the green malt product as described hereinabove is processed to molded masses or, respectively, molded bodies, for instance, by compressing the malt in suitable hydraulic or power presses.

As is well known, the manufacture of beer and other fermented malt beverages comprises several steps, namely the mashing and brewing step, wherein the malt and, if desired, suitable adjuncts, such as unmalted barley, rice, corn grits or flakes, and the like material are mashed with water. During mashing saccharification of starch by the diastase enzyme is the most important chemical reaction taking place. Thereby the starch is inverted to dextrins, maltose, and glucose. The diastatic activity of the malt is usually sufficient to invert not only the malt starches themselves but also the starches in the adjuncts.

The temperature during mashing ranges between about 67° C. and about 73° C. If adjuncts are added, they are preferably cooked prior to the mashing step in order to solubilize their starches. When conversion is completed, the temperature is raised to at least about 75° C. to inactivate the enzymes.

The mash is then passed into so-called lauter tuns provided with false bottoms containing perforations through which the wort runs off. The undissolved grain and husks remaining in a mass on the perforated false bottom are washed and extracted with water to recover the soluble substances retained thereby. Filter presses may also be used or removing the soluble wort from the insoluble grain and husk particles.

Thereafter the wort is boiled in the brewing kettle with hops. Boiling aids in coagulating proteins which might prevent the production of a clear finished beer. It also sterilizes the wort and destroys the enzymes and, furthermore, concentrates the wort. Hopping imparts aroma and flavor to the beverage. It aids in protein coagulation by forming protein-tannin complexes and has preservative qualities which stabilize the beer.

When boiling is completed, the wort is rapidly removed from the hops and is cooled. The cooled wort is then subject to fermentation by the addition of yeast. The yeast converts the sugars produced in the mashing step into alcohols and small quantities of various oxidation products which impart the characteristic flavor to the beverage. Fermentation is carried out at a temperature not exceeding about 15° C. while aerating the wort. After fermentation is completed, the yeast is removed and the completely fermented beer or the like malt beverage is finished by cooling, blending, storage in the ruh cellars, addition of a proteolytic enzyme, filtering, and bottling.

The present invention differs from this known brewing process by the use of the specific green malt product described hereinabove, in combination with kiln-dried malt. As stated above, the amount of green malt according to the present invention is between about 30% and about 50% of the total amount of malt used.

According to an advantageous embodiment of the present invention, the specific green malt product described hereinabove is added after a thick mash or, respectively, a boiled mash derived from kiln-dried malt alone or from a mixture of kiln-dried malt and part of the green malt product according to the present invention has been produced. Of course, the green malt may also be added to thick mash or boiled mash produced in any other manner. Thus, the present invention consists in principle in using such a green mash rapidly dried under predetermined high temperature conditions together with kiln-dried mash for making fermented malt beverages, especially for making beer. Thereby, beverages with a higher viscosity and, as a result thereof, with a higher foaming power and better foam-holding capacity are produced.

The following examples serve to illustrate the present invention without, however, limiting the same thereto.

*Example 1*

Unmalted barley is steeped in water of 10-15° C. Air is blown into the steeping tank. The steeping water is changed several times. As soon as germination sets in, i.e. as soon as the rootlets have visibly broken through the husk, or, respectively, as soon as the diastase activity in the grain starts to increase, steeping is discontinued.

The rootlets are removed from the green malt by suspending the malt in water and exposing the suspension to a strong current of air to cause breaking off of the rootlets from the grain. Thereby the malt is vigorously agitated and, at the same time, the broken off rootlets are collected at the surface of the suspension from where they are removed by skimming off The resulting moist malt (green malt) is then subjected to a very rapid drying process at a high temperature. It is an essential feature of the present invention that the temperature within the malt increases very rapidly to a temperature exceeding 60° C. so that any substantial fermentative activity of ferments and especially cytolytic ferments in the malt is arrested.

The rapid drying step according to the present invention whereby a high temperature is attained within the malt, is carried out, for instance in the following manner:

(a) The moist green malt is passed over roller driers heated with steam of a pressure of about 5 atmospheres gauge. It is advisable to comminute the moist malt before drying by squashing, crushing, grinding and the like to break the starch loose from the husk.

Comminution is preferably carried out in such a manner that the malt spelt is not affected and the husk is not excessively damaged but remains substantially unchanged, so that it may act as a natural filter bed on subsequent filtration of the mash, for instance, through lauter tuns or other clarifying devices. The squashed, crushed, or ground moist malt is preferably adjusted to a water content of about 60%, if necessary by the addition of water, during or after comminution and is then fed to the heated roller drier. The malt is dried on such driers within a few minutes to a water content between about 6% and about 10%. The temperature of the comminuted malt applied to the roller drier rises to 90° C. and higher within a few minutes so that substantially no fermentative processes can take place in the malt product during drying. It is especially noteworthy that no cytolytic degradation processes, i.e. no processes causing dissoltuion of cellulose and cellulose accompanying substances can take place, because carbohydrases, which produce such cytolytic effects, for instance, cytase, lose their fermentative activity at about 60° C. The dried malt product which falls off the roller drier in the form of continuous thin veil-like layers can be crushed or comminuted to fine flakes of varying particle size. The dried malt product contains swollen starch, completely or partly heat-coagulated protein, only a very slight or no ferment activity at all, and viscosity increasing substances, which enter into solution on subsequent mashing.

(b) The preferably comminuted or crushed green malt is introduced into a tunnel-drying oven and is rapidly heated therein to such a high temperature that the malt itself attains a temperature exceeding 60° C. within a few minutes so that its ferment activity is rapidly and completely arrested and the enzymes are destroyed.

In place of a tunnel-drying oven there may be employed shaft furnace driers or rotary driers, belt-type dehydrators, vacuum driers of various types and the like drying apparatus provided they permit rapid increase of the drying temperature within the malt product to be dried to a temperature exceeding 60° C.

(c) Another method of drying the moist malt makes use of drying apparatus as they are employed in the production of cereal flakes, such as rolled oats and the like. For this purpose, the green malt is steamed for a short period of time, whereby the temperature rises to a temperature exceeding 60° C. within a very short period of time. The steamed malt is then forced through a so-called flaking mill, i.e. through a mill with smooth rolls which are spaced only very slightly apart from each other to form a narrow space therebetween. Subsequently complete drying of the pressed malt is effected on a continuous belt drier in such a manner that the malt product attains a temperature exceeding 60° C. within a very short period of time and that its water content is decreased to about 10%. Thereby, the dried malt product is obtained in the form of cereal flakes. This drying process has the advantage that the spelt of the malt is only roughly broken so that it is able to accelerate filtration of the mash, for instance, by means of lauter tuns. In this manner it is possible to produce a malt in flake form which, in contrast to the malt products described hereinabove under (a) and (b), has still a high diastatic ferment activity.

(d) The malt products produced as described hereinabove by drying green malt according to methods (a), (b), and (c), especially the malt products which are obtained in flake form, occupy a large volume and, therefore, require for shipment relatively large quantities of packing material and considerable shipping space. For instance, chipped malt flakes produced according to Example 1(a) can be filled only in an amount between 20 kg. and 25 kg. in conventional grain sacks or, respectively, flour sacks, which ordinarily have a carrying capacity of about 100 kg. of grain or flour. In order to reduce the volume of such malt flakes and the like products as they are obtained according to the present invention, they are exposed to the action of power presses. Thereby, it is possible to convert such malt products into stable bodies of considerably reduced volume, such as small tubes, cylinders, tablets, briquet-like bodies, or larger bale-like bodies without the addition of a binding agent. This is probably due to their content of swollen starch. The treatment in power presses must be carried out in such a manner that, on the one hand, stable compressed bodies of reduced volume are obtained and that, on the other hand, the resulting compressed bodies readily disintegrate on mashing or, respectively, readily dissolve in the mashing water to form the wort.

In place of barley, there may, of course, be used other unmalted grain such as wheat and the like.

Steeping may be carried out at a temperature between about 10° C. and about 30° C. Preferably moist air is blown into the steeping vessel. Oxygen or oxygen-enriched air may also be employed. Furthermore, oxygen may be added to the steeping water in the form of chemical agents capable of splitting off oxygen, for instance, in the form of hydrogen peroxide.

It has been found advisable to add, preferably to the first steeping water, a small amount of an alkaline agent, such as calcium oxide, calcium hydroxide, sodium hydroxide and the like.

If desired, the treatment with steeping water may be interrupted by a treatment of the moist steeped grain with air, after withdrawing excess steeping water. For this purpose the germinating steeped grain is left by itself without water but exposed to air. Preferably, moist air or oxygen is passed through the steeped grain. The air or oxygen is advantageously in moist condition.

It is also possible to steep the unmalted grain, as usually done in making malt and then to subject the green malt to conventional germination by floor-malting, compartment-malting, drum-malting, or other pneumatic malting whereby care must be taken that the development of rootlets is arrested shortly after they become visible. This short-time germination step is the most important characteristic feature of the present invention.

In order to remove the rootlets from the green malt, other gases than air may be passed through the suspension of the green malt in water under conditions whereby the malt is vigorously agitated. The rootlets collected at the surface of the aqueous suspension cannot only be removed by skimming them off but also by withdrawing the upper liquid layer through overflow pipes and the like.

For rapidly drying the green malt in roller dryers, dryers of any conventional type may be used, preferably such which are provided with one or several charging rollers and/or press rollers. The roller dryer may be provided with internal cooling or heating devices.

The water content of the moist crushed or squashed green malt, before drying, is adjusted to a water content between about 50% and about 70%, if necessary, by the addition of water during or after comminution.

*Example 2*

The comminuted green malt obtained according to Example 1 is used for producing wort employed for making beer and the like fermented malt beverages. First 70 parts of kiln-dried malt are mashed in the usual manner with water. 30 parts by weight of the dried green malt obtained according to Example 1 are then added to the resulting mash. Mashing is continued until the mash is completely saccharified. The resulting mash is then filtered through a mash filter and the wort is boiled with hops, turned out from the kettle, clarified, and fermented with brewer's yeast. Preferably top-fermenting yeast is used for this purpose. All the other measures and operations are carried out as they are conventionally carried out in breweries or other plants producing fermented malt beverages. At least part of the yeast should consist of non-flocculating yeast since such yeast has proved to be especially suitable. In place of a mash filter there may, of course, also be used a lauter tun.

*Example 3*

When rapidly drying the green malt as disclosed hereinbefore in Example 1, inclusions may be encountered due to protein coagulation and the formation of swollen starch or, respectively, swollen cellulose. Such inclusions are of great disadvantage since they are saccharified or, respectively, dissolved only with difficulty when treating the mash in the conventional manner without boiling. As a result of the presence of such inclusions losses in solubles may occur. Therefore, according to the present example, the dried green malt as prepared according to Example 1, is added in the one step-mashing process or in the two or three step-mashing processes to the thick mash or decoction and is then boiled together with such thick mash or decoction to saccharifying temperatures, whereafter boiling is continued for a more or less prolonged period of time as it is customary in the brewing art. The resulting thick mash or decoction is then mixed with the initial mash. Mashing is continued and the procedure is followed as given in Example 2. When adding the malt products obtained according to Example 1 to the thick mash or decoction, the yield of extract from these malt products is increased to about 1% to about 4%.

Fermented malt beverages and especially beer obtained in this manner show, in contrast to fermented beverages and beer prepared from the same kiln-dried malt but without the addition of the malt products according to the present invention, an increase in viscosity and a far better foaming power as well as foam-holding capacity. Such beverages are also distinguished by their excellent stability and keeping quality as well as by their light color and agreeable, mild taste.

Of course, many changes and variations in the preparation of the novel malt product rich in substances increasing the viscosity of fermented beverages made therefrom, such as in the steeping procedure, the manner of germination, the steeping and germination temperature and duration, the method of rapidly heating and drying the green malt, in the preparation of mash from such a malt product, in the working up and fermenting of the resulting mash, and the like may be made by those skilled in the art in accordance with the principles set forth herein and in the claims annexed thereto.

I claim:

1. In a process of producing malt rich in substances increasing the viscosity of fermented beverages made therefrom, the steps comprising rapidly heating green malt to a temperature of at least about 60° C. within a period of time not exceeding about 15 minutes, said temperature being sufficiently high to destroy the cytolytic ferment activity of said green malt, and reducing the water content of the malt at least to about 15%.

2. The process according to claim 1, wherein the green malt is a green malt obtained by steeping of unmalted grain until germination sets in.

3. The process according to claim 1, wherein the green malt is a green malt in grain form.

4. The process according to claim 1, wherein the green malt is crushed before heating.

5. In a process of producing malt rich in substances increasing the viscosity of fermented beverages made therefrom, the steps comprising steeping unmalted grain until germination sets in, exposing the resulting green malt to the action of steam for not more than 15 minutes to rapidly increase the temperature within the malt to at least 60° C., and rapidly flaking the heated malt at a temperature exceeding 60° C., thereby reducing the water content to not more than 15%.

6. In a process of producing malt rich in substances increasing the viscosity of fermented beverages made therefrom, the steps comprising steeping unmalted grain until germination sets in, suspending the resulting green malt in water, passing a vigorous current of gas through the suspension to agitate the malt, to break off the rootlets, and to collect the broken off rootlets at the surface of the suspension, removing the rootlets from the malt suspension, draining off the water, and rapidly heating the moist green malt substantially free of rootlets to a temperature of at least about 60° C. within a period of time not exceeding about 15 minutes, said temperature being sufficiently high to destroy the cytolytic ferment activity of said green malt, and reducing the water content of the malt at least to about 15%.

7. In a process of producing malt rich in substances increasing the viscosity of fermented beverages made therefrom, the steps comprising steeping unmalted grain until germination sets in, suspending the resulting green malt in water, passing a vigorous current of gas through the suspension to agitate the malt, to break off the rootlets, and to collect the broken off rootlets at the surface of the suspension, removing the rootlets from the malt suspension, draining off the water, exposing the moist green malt to the action of steam for not more than 15 minutes to rapidly increase the temperature within the malt to at least 60° C., and rapidly flaking the heated malt at a temperature exceeding 60° C., thereby reducing its water content to not more than 15%.

8. In a process of producing malt rich in substances increasing the viscosity of fermented beverages made therefrom, the steps comprising rapidly heating green malt to a temperature of at least about 60° C. for a period of time not exceeding about 15 minutes, said temperature being sufficiently high to destroy the cytolytic ferment activity of said green malt, reducing the water content of the malt at least to about 15%, and compressing the resulting dried malt to compressed bodies readily disintegrating on mashing.

9. In a process of producing fermented malt beverages of improved foaming power and foam-holding capacity, the steps comprising rapidly heating green malt to a temperature of at least about 60° C. for a period of time not exceeding about 15 minutes, said temperature being sufficiently high to destroy the cytolytic ferment activity of said green malt, reducing the water content of the malt at least to about 15%, mixing the resulting dried green malt with kiln-dried malt, mashing said mixture and fermenting the wort obtained from said mash.

10. The process of producing fermented malt beverages of improved foaming power and foam-holding capacity, according to claim 9, wherein the dried green malt is present in the mash in an amount between about 5% and about 30% of the total malt and mixture of kiln-dried malt for mashing.

11. In the process of producing fermented malt beverages of improved foaming power and foam-holding capacity, the steps comprising first preparing a thick mash of kiln-dried malt, adding thereto a dried malt product obtained by rapidly heating green malt to a temperature of at least about 60° C. for a period of time not exceeding about 15 minutes, said temperature being sufficiently high to destroy the cytolytic ferment activity of said green malt, and by reducing the water content of the malt at least to about 15%, and fermenting the wort obtained from said mash.

12. A dried malt product rich in substances increasing the viscosity of fermented beverages made therefrom, said dried malt product being obtained by rapidly heating green malt to a temperature of at least about 60° C. for a period of time not exceeding about 15 minutes, said temperature being sufficiently high to destroy the cytolytic ferment activity of said green malt, and by reducing the water content of the malt at least to about 15%.

References Cited in the file of this patent
UNITED STATES PATENTS

| | | |
|---|---|---|
| 48,396 | Hawks | June 27, 1865 |
| 1,391,557 | Mayer | Sept. 20, 1921 |
| 1,950,418 | Schreier | Mar. 13, 1934 |
| 2,694,011 | Frieden et al. | Nov. 9, 1954 |